(12) United States Patent
Carrington-Fair et al.

(10) Patent No.: US 11,881,986 B2
(45) Date of Patent: Jan. 23, 2024

(54) FAST FAILOVER SUPPORT FOR REMOTE CONNECTIVITY FAILURE FOR A VIRTUAL TUNNEL

(71) Applicant: Arista Networks, Inc., Santa Clara, CA (US)

(72) Inventors: Matthew Carrington-Fair, Bedford, MA (US); Mayukh Saubhasik, Richmond (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/558,944

(22) Filed: Dec. 22, 2021

(65) Prior Publication Data

US 2022/0210006 A1 Jun. 30, 2022

Related U.S. Application Data

(60) Provisional application No. 63/132,127, filed on Dec. 30, 2020.

(51) Int. Cl.
| | |
|---|---|
| *H04L 41/0654* | (2022.01) |
| *H04L 45/00* | (2022.01) |
| *H04L 41/0659* | (2022.01) |
| *H04L 43/0811* | (2022.01) |
| *H04L 12/46* | (2006.01) |
| *H04L 45/50* | (2022.01) |
| *H04L 45/28* | (2022.01) |

(52) U.S. Cl.
CPC ...... *H04L 41/0661* (2023.05); *H04L 12/4633* (2013.01); *H04L 43/0811* (2013.01); *H04L 45/28* (2013.01); *H04L 45/38* (2013.01); *H04L 45/50* (2013.01)

(58) Field of Classification Search
None
See application file for complete search history.

(56) References Cited

U.S. PATENT DOCUMENTS 9,509,398 B2 * 11/2016 Meki ............... H04B 10/29
2009/0287955 A1 * 11/2009 Matsumoto ......... H04L 12/4633
714/E11.113

(Continued)

OTHER PUBLICATIONS

International Search Report and Written Opinion dated Apr. 4, 2022 for corresponding PCT Application No. PCTUS2021065435 filed Dec. 29, 2021 (15 pages).

*Primary Examiner* — Eunsook Choi
(74) *Attorney, Agent, or Firm* — Tianyi He (57) ABSTRACT

In general, embodiments relate to a method for managing traffic flow along a path between network devices. The method includes initiating, by an end-point network device, monitoring of the path, wherein the end-point network device transmits packets to a target network device over the path, detecting after the initiating, by the end-point network device, that at least a portion of the path has failed, wherein the portion of the path that has failed is external to the end-point network device, in response to the detecting, identifying which portions of network device hardware in the source network device need to be updated to redirect the packets from the end-point network device to the target network device to take a second path, and updating the identified portions of the network device hardware.

20 Claims, 10 Drawing Sheets

(56) References Cited

U.S. PATENT DOCUMENTS

| | | | |
|---|---|---|---|
| 2015/0312141 A1* | 10/2015 | Sato | H04L 45/28 370/225 |
| 2017/0214549 A1* | 7/2017 | Yoshino | H04L 12/4641 |
| 2017/0359247 A1 | 12/2017 | Dixon | |
| 2018/0167272 A1 | 6/2018 | Wu et al. | |
| 2019/0190812 A1* | 6/2019 | Verma | H04L 12/4633 |

\* cited by examiner

FAST FAILOVER SUPPORT FOR REMOTE CONNECTIVITY FAILURE FOR A VIRTUAL TUNNEL

CROSS-REFERENCE TO RELATED APPLICATIONS

This application benefits under 35 USC § 119 to U.S. Provisional Application No. 63/132,127 filed on Dec. 30, 2020. U.S. Provisional Application No. 63/132,127 is hereby incorporated by reference in its entirety.

BACKGROUND

Network devices implement network operating systems that are specifically designed to communicate with hardware (e.g., network hardware) in the network devices. Further, the communication between endpoints using network devices may utilize virtual tunnels each including one or more network devices between the endpoints.

DETAILED DESCRIPTION

Network devices are typically connected to each other via one or more paths that traverse a network (which itself is made up of network devices). These paths may be implemented as tunnels that connect one network device to another network device and/or one interface on a network device to another interface (or VTI) on a network device. Non-limited examples of tunnels include VXLAN, MPLS, and NVGRE.

In current implementations, if the remote end of a tunnel goes down, but all the local interfaces are still up, then a network device (e.g., hardware or software executing thereon) may not quickly detect that the tunnel is down. For example, consider a scenario in which a network device (CE-1) is communicating with a second network device (CE-2) via multiple paths. If a network device (PE-11) in the path between CE-1 and CE-2 goes down then network traffic between CE-1 and CE-2 can no longer flow through PE-11; however, prior to embodiments discussed below, CE-2 would not be able to quickly detect that CE-1 is not accessible via the path CE-2 to PE-21 to PE-11 to CE-1 ("Path 1") because the interface between CE-2 and PE-21 is still operational. The result of this delayed detection is that until CE-2 detects that Path 1 is down, CE-2 will continue to send traffic to CE-1 via Path 1. At some later point in time, CE-2 may ultimately detect that Path 1 is down and then transition to using a second path, e.g., CE-2 to PE-21 to PE-12 to CE-1 ("Path 2") and then start transmitting traffic along Path 2.

Embodiments disclosed herein enable an end-point network device (e.g., CE-2) to perform a fast failover from Path 1 to Path 2. In various embodiments, to be able to perform a fast failover—embodiments include a component(s) (which may be implemented in hardware, software, or a combination thereof) to detect the operational status of paths between various network devices (or interfaces thereon), and one or more components (which may be implemented in hardware, software, or a combination thereof) to react to the operational status and perform the backup path failover. The inclusion of these two components (or the functionality provided by these components) in network devices improves convergence time in the event of a network failure. Prior to embodiments disclosed herein, network devices handled failover based on local link events in which network devices could quickly failover to a backup path for a given set of network protocol routes if the link the primary path went down. However, these network devices lacked the ability to detect remote failures along a path, e.g., when a transit network device went down, or if the remote peer were to have some failure.

More specifically, embodiments include installing virtual tunnel state agents on the end-point network devices. The virtual tunnel state agents may set up and/or otherwise identify the virtual tunnels available to access a second end-point network device. The virtual tunnels may be prepared for each additional end-point network device connected to the end-point network device, as configured by a network administrator. After installation of the virtual tunnel state agents, the virtual tunnel state agent may implement bi-directional forwarding detection (BFD) to determine whether all network devices in a specific virtual tunnel between two end-point network devices are functional (i.e., whether the network devices are capable of passing network traffic or whether one or more of the network devices has failed).

Various embodiments of the disclosure are described below.

Figure 1A:
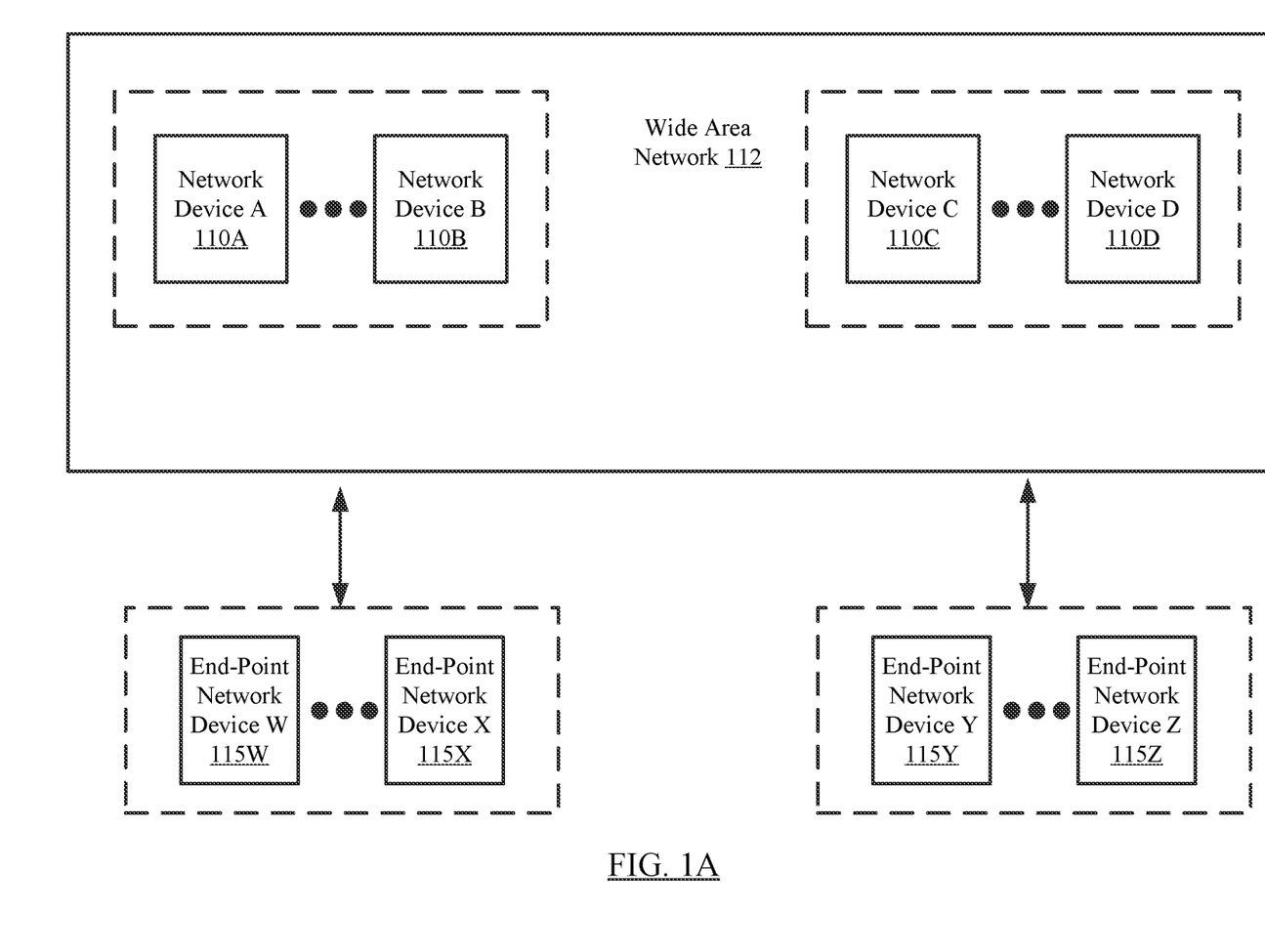
FIG. 1A shows a diagram of a system in accordance with one or more embodiments.

FIG. 1A shows a system in accordance with one or more embodiments of the disclosure. As shown in FIG. 1A, the system includes a wide area network (112) that includes one or more network devices (110A, 110B, 110C, 110D). Further, the system includes one or more end-point network devices (115W, 115X, 115Y, and 115Z) that enable computing devices (not shown) (see e.g., FIG. 4) to connect to the wide area network (112). Each of these components is operatively connected via any combination of wired and/or wireless connections without departing from the disclosure. The system may include additional, fewer, and/or different components without departing from the disclosure. Each of the aforementioned components illustrated in FIG. 1A is described below.

In one or more embodiments, each of the network devices (e.g., 110A, 110B, 110C, 110D) and end-point network devices (115W, 115X, 115Y, and 115Z) includes functionality to receive packets at any of the physical network interfaces (e.g., ports) of the network device and to process the packets. In one or more embodiments, the network device includes functionality for transmitting data between network devices (110A, 110B, 110C, 110D), end-point network devices (115W, 115X, 115Y, and 115Z), and/or between components in a network device (110A, 110B, 110C, 110D). The process of receiving packets, processing the packets, and transmitting the packets may be in accordance with, at least in part, instructions issued by a host computing device (further discussed in FIG. 1B).

In one embodiment of the disclosure, the one or more network device(s) (110A, 110B, 110C, 110D, 115W, 115X, 115Y, and 115Z) are physical devices (not shown) that include persistent storage, memory (e.g., random access memory), one or more processor(s), network device hardware (including a switch chip(s), line cards, etc.)), and two or more physical ports. In one embodiment of the disclosure, the network device is hardware that determines which egress port on a network device to forward media access control (MAC) frames. Each physical port may or may not be connected to another device (e.g., a client device, another network device) on a network device on the wide area network (112) (e.g., a server, a switch, a router, etc.). The network device (or more specifically the network device hardware) may be configured to receive packets via the ports and determine whether to: (i) drop the packet; (ii) process the packet in accordance with one or more embodiments of the disclosure; and/or (iii) send the packet, based on the processing, out another port on the network device. While the aforementioned description is directed to network devices that support Ethernet communication, the disclosure is not limited to Ethernet; rather, the disclosure may be applied to network devices using other communication protocols. For additional details regarding a network device (e.g., 110A, 110B, 110C, 110D, 115W, 115X, 115Y, and 115Z), see, e.g., FIG. 1B.

As discussed above, in one embodiment of the disclosure, the one or more end-point network devices (115W, 115X, 115Y, and 115Z) enable one or more computing devices (not shown) (see e.g., FIG. 4) to connect to the wide area network (112). In one embodiment of the disclosure, an end-point network device (e.g., 115W, 115X, 115Y, and 115Z) includes functionality to manage the operation of paths in which network traffic (e.g., packets) travels between network devices (110A, 110B, 110C, 110D) and/or end-point network devices (115W, 115X, 115Y, 115Z). In one or more embodiments of the disclosure, the paths refers to a combination of network devices (110A, 110B, 110C, 110D) used during the transfer of packets from one end-point network device to a second end-point network device. During the transmission of packets between the end-point network devices (115W, 115X, 115Y, 115Z), any path may be used. For additional details regarding paths, see, e.g., FIG. 1B.

In one or more embodiments of the disclosure, the end-point network devices (115W, 115X, 115Y, 115Z) may generate, monitor, and/or otherwise manage virtual tunnels. In one or more embodiments of the disclosure, a virtual tunnel refers to a path that is limited to a specific set of network devices (110A, 110B, 110C, 110D). Each network device in the set of network devices of a virtual tunnel may be used to monitor the virtual tunnel. When a network device in the virtual tunnel experiences a failure (e.g., it is unable to perform the functionality of maintaining network traffic), remediation may be initiated or otherwise performed. The managing of the virtual tunnels may be performed in accordance with, e.g., FIGS. 2A and 2B. For additional details regarding the end-point network devices (115W, 115X, 115Y, 115Z), see, e.g., FIG. 1C.

Figure 1B:
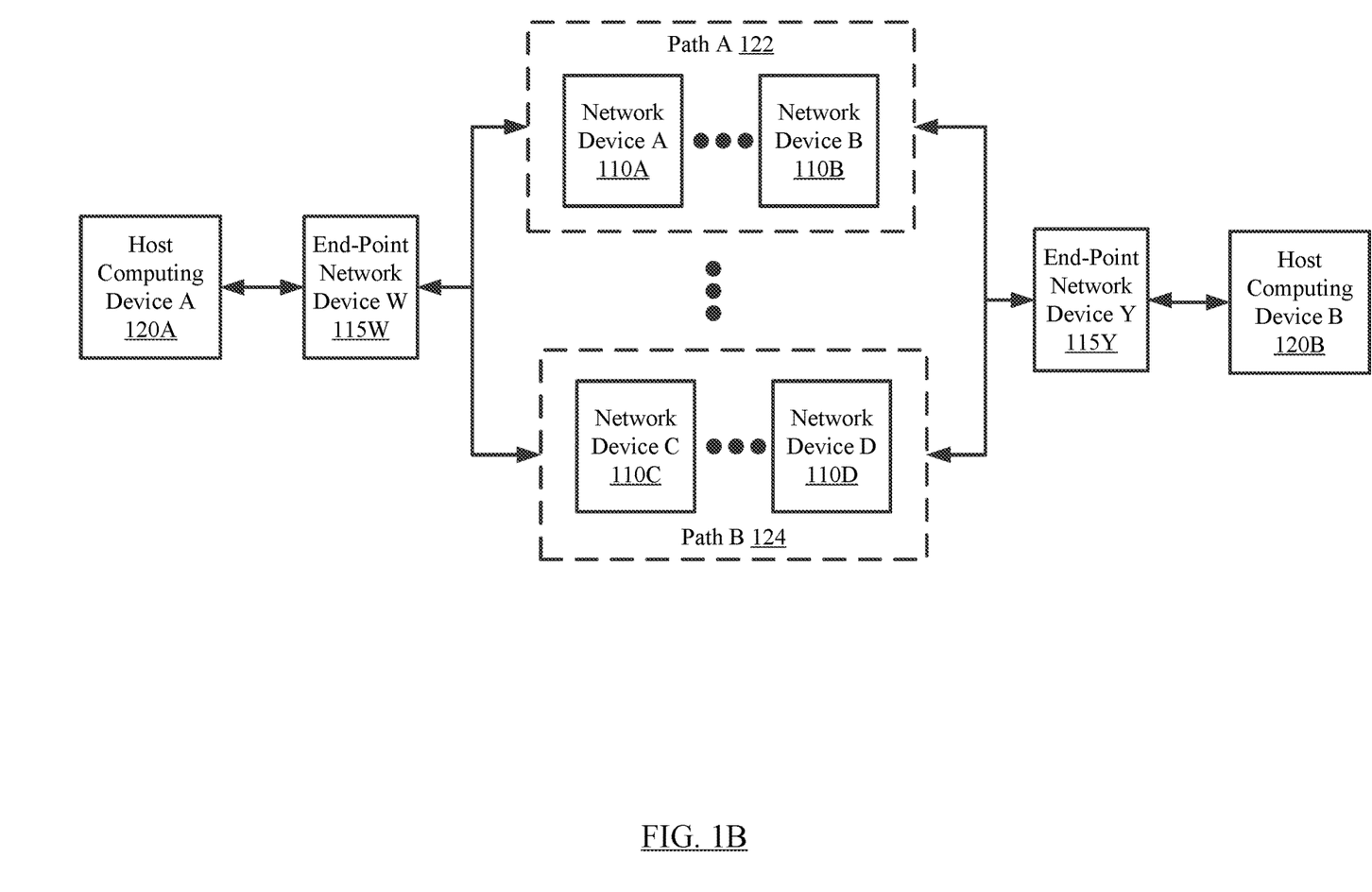
FIG. 1B shows a second diagram of the system in accordance with one or more embodiments.

FIG. 1B shows a second diagram of the example system in accordance with one or more embodiments disclosed herein. For the sake of brevity, not all components of the example system are illustrated in FIG. 1B. The example system of FIG. 1B includes two host computing devices (120A, 120B) that transmit and/or receive packets across a network of network devices (110A, 110B, 110C, 110D, 115W, 115Y). Each host computing device (120A, 120B) may be directly connected to an end-point network device (115W, 115Y). Each end-point network device (115W, 115Y) may be operatively connected to each other via any number of paths (e.g., 122, 124). Each path (122, 124) may include any number of network devices (110A, 110B, 110C, 110D). Each network device (110A, 110B, 110C, 110D) may belong to any number of paths. For example, network device A (110A) may belong to both path A (122) and path B (124).

Without the implementation of virtual tunnels, during transfer of packets from host computing device A (120A) to host computing device B (120B), any path (122, 124) may be used to transmit data. The path selected to perform the data transmission may be based on any mechanism. At any point during the transmission of network traffic, if a network device fails to perform as expected, the end-point network devices may still attempt to transmit packets via the path that includes the failed network device. Specifically, if the failed network device corresponds to a path used to transmit packets, the network device(s) directly connected to the failed network device may attempt to continue sending data without the discovery of the failed state of the network device for an undesired period of time before a remediation is performed. To reduce the negative effects of a failed network device, virtual tunnels may be set up by the end-point network devices (115W, 115Y). The virtual tunnels may be monitored by the end-point network devices in accordance with FIG. 2B.

Figure 1C:
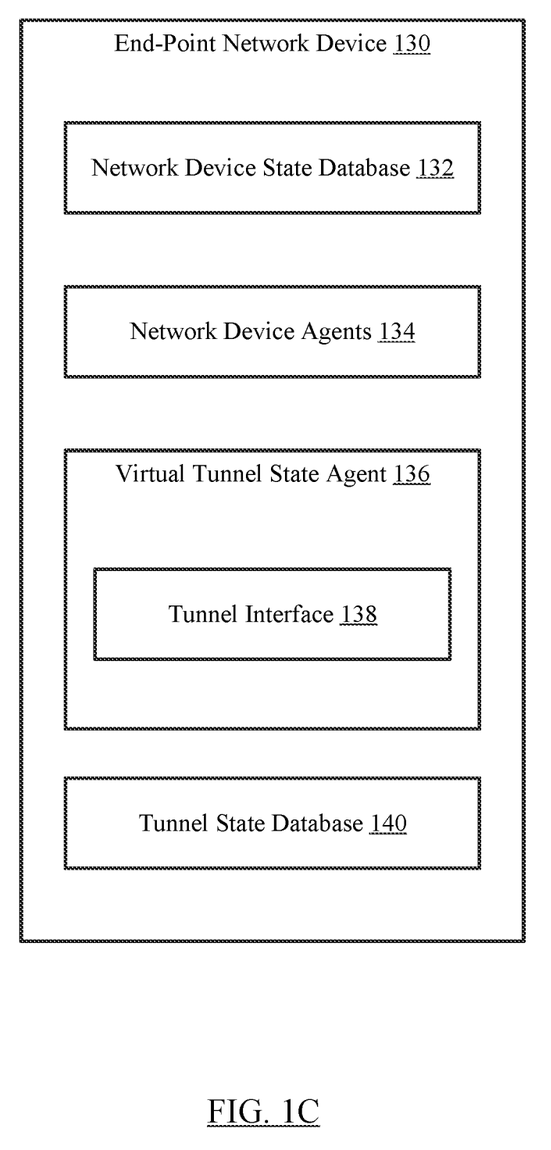
FIG. 1C shows a diagram of an endpoint network device in accordance with one or more embodiments.

FIG. 1C shows a diagram of an end-point network device in accordance with one or more embodiments of the disclosure. The end-point network device (130) may be an embodiment of an end-point network device (e.g., 115W, FIG. 1A or 1B) discussed above. As discussed above, the end-point network device (130) may include functionality for transmitting packets between network devices and/or managing virtual tunnels. To perform the aforementioned functionality, the end-point network device (130) includes a network device state database (132), one or more network device agents (134), a virtual tunnel state agent (136) that includes a tunnel interface (138), and a tunnel state database (140). The end-point network device (130) may include additional, fewer, and/or different components without departing from the disclosure. Each of the aforementioned components illustrated in FIG. 1B is described below.

In one embodiment of the disclosure, the network device state database (132) includes the current state of the network device (130). The state information stored in the network device state database (132) may include, but is not limited to: (i) information about (and/or generated by) all (or a portion of the) services currently executing on the network device; (ii) the version of all (or a portion of the) software executing on the network device; (iii) the version of all firmware on the network device; (iv) hardware version information for all (or a portion of the) hardware in the network device; (v) information about the current state of all (or a portion of the) tables (e.g., routing table, forwarding table, etc.) in the network device that are used to process packets, where information may include the current entries in each of the tables, and (vi) information about all (or a portion of the) services, protocols, and/or features configured on the network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features. In one embodiment of the disclosure, the network device state database (132) includes control plane state information associated with the control plane of the network device. Further, in one embodiment of the disclosure, the state database includes data plane state information (discussed above) associated with the data plane of the network device. The network device state database (132) may include other information without departing from the disclosure.

In one embodiment of the disclosure, the network device state database (132) may be implemented using any type of database (e.g., a relational database, a distributed database, etc.). Further, the network device state database (132) may be implemented in-memory (i.e., the contents of the state database may be maintained in volatile memory). Alternatively, the network device state database (132) may be implemented using persistent storage. In another embodiment of the disclosure, the network device state database (132) may be implemented as an in-memory database with a copy of the state database being stored in persistent storage. In such cases, as changes are made to the in-memory database, copies of the changes (with a timestamp) may be stored in persistent storage. The use of an in-memory database may provide faster access to the contents of the network device state database (132).

Those skilled in the art will appreciate that while the term "database" is used above, the network device state database (132) may be implemented using any known or later developed data structure(s) to manage and/or organize the content in the state database.

In one embodiment of the disclosure, the end-point network device (130) further includes one or more network device agents (134). The network device agents (134) interact with the network device state database (132). Each network device agent (134) facilitates the implementation of one or more protocols, services, and/or features of the network device (130). Examples of network device agents, include, but are not limited to, a routing information base agent, a forwarding information base agent, and a simple network management protocol (SNMP) agent. Furthermore, each network device agent includes functionality to access various portions of the network device state database (132) in order to obtain the relevant portions of the state of the network device (130) in order to perform various functions. Additionally, each network device agent includes functionality to update the state of the network device (130) by writing new and/or updated values in the network device state database (132), corresponding to one or more variables and/or parameters that are currently specified in the network device (130).

In one embodiment of the disclosure, the virtual tunnel state agent (136) includes functionality for managing virtual tunnels implemented by the end-point network device (130). The virtual tunnel state agent (136) may manage the virtual tunnels by identifying paths to a second end-point network device and implementing a policy that specifies utilizing a primary path as a primary virtual tunnel, including alternative virtual tunnels as backup virtual tunnels, and transferring all network traffic from the end-point network device to the second end-point network device via the primary virtual tunnel.

Further, the virtual tunnel state agent (136) utilizes a tunnel interface (138) to perform liveness detection of the virtual tunnels (primary or otherwise) to determine the liveness of the virtual tunnels. In one embodiment of the disclosure, liveness refers to a state of the virtual tunnel in which all network devices in the virtual tunnel are operational. The liveness detection may be performed using bidirectional forwarding detection (BFD). In one embodiment of the disclosure, BFD refers to a mechanism for periodically sending messages across the virtual tunnel to a second end-point network device and expecting a response. If a response is received, the virtual tunnel is deemed operational; otherwise, the virtual tunnel is not operational, and a failover is to be performed. The virtual tunnel agent (136) may perform the method of FIGS. 2A-2B to manage the virtual tunnels.

In one or more embodiments of the disclosure, the virtual tunnel state agent (138) further utilizes a tunnel state database (140) to perform the aforementioned functionality. Specifically, the state of the virtual tunnels, the setting of the primary virtual tunnel implemented for network traffic with every end-point network device is stored in the tunnel state database (140). The virtual tunnel state agent (138) may update the tunnel state database (140) with the implemented virtual tunnels. Further, the virtual tunnel state agent (136) may refer to the tunnel state database to determine which virtual tunnel is the primary virtual tunnel. This may be used to determine which network device to send data corresponding to the second end-point network device to which the data is to be sent.

In one embodiment of the disclosure, the virtual tunnel state agent (136) includes functionality to access various portions of the tunnel state database (140) in order to obtain the relevant portions of the state of the network device in order to perform various functions. Additionally, the virtual tunnel state agent (136) includes functionality to update the state of the network device (130) by writing new and/or updated values in the tunnel state database (140).

Figure 2A:
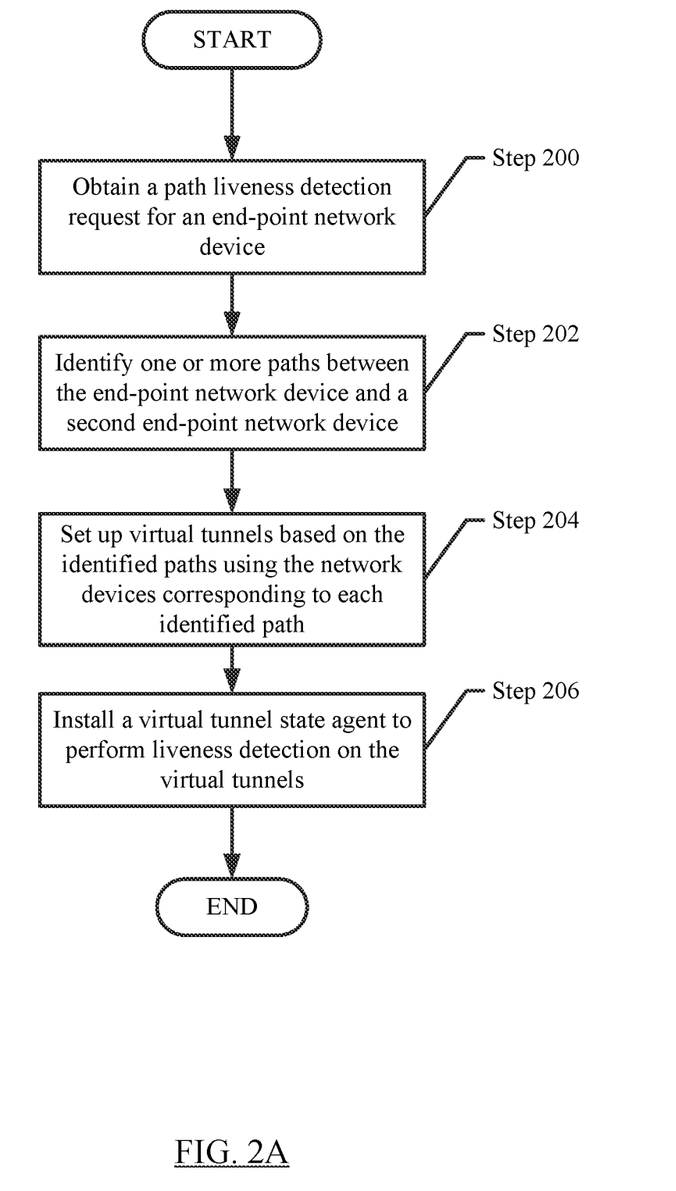
FIG. 2A shows a flowchart for a method for managing virtual tunnels between two end-point network devices in accordance with one or more embodiments.
Figure 2B:
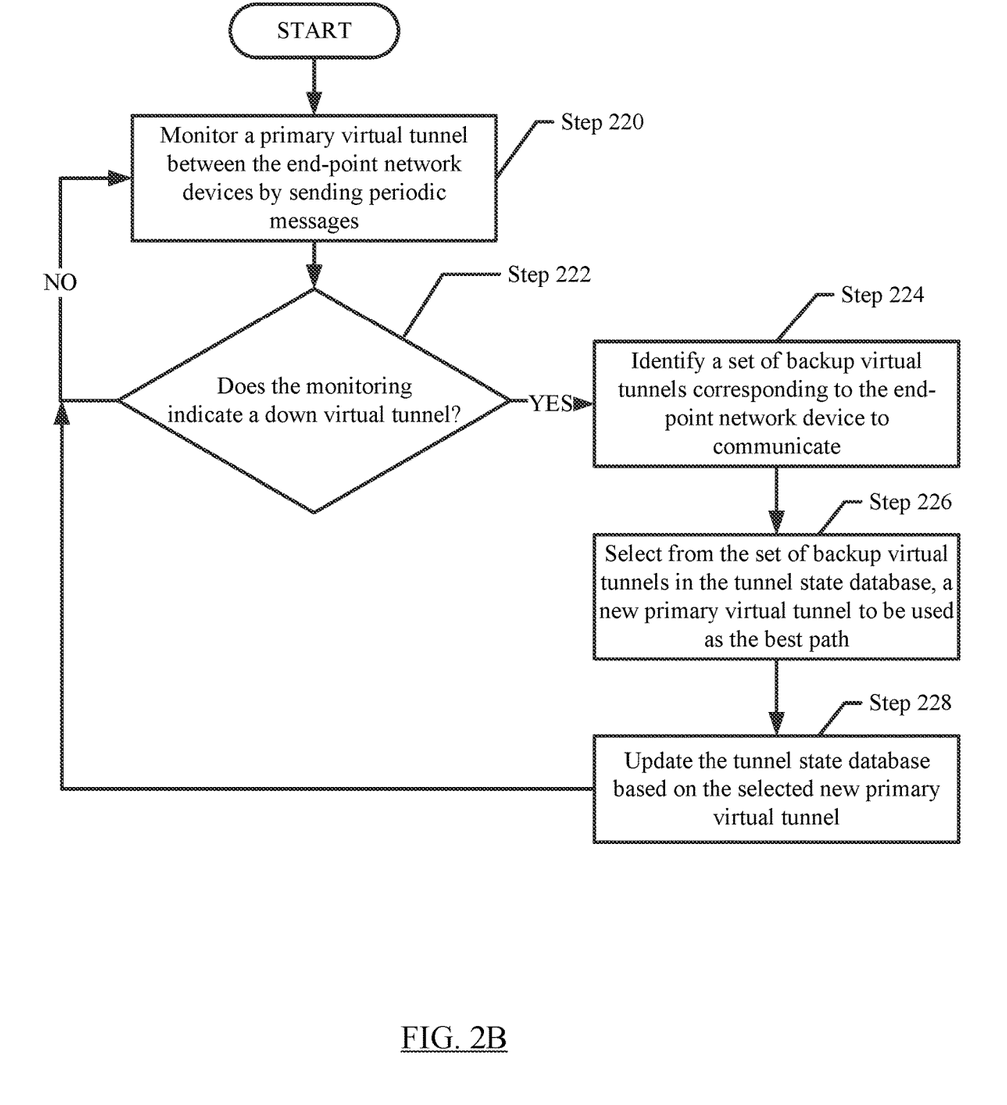
FIG. 2B shows a flowchart for a method for performing a fast failover of a virtual tunnel in accordance with one or more embodiments.

The tunnel interface (138) may include functionality for monitoring the virtual tunnels in accordance with FIG. 2B. Further, the tunnel interface (138) includes functionality for notifying the virtual tunnel state agent (136) of any changes to the virtual tunnels.

In one embodiment of the disclosure, the tunnel state database (140) may be implemented using any type of database (e.g., a relational database, a distributed database, a cluster of multiple databases, etc.). Further, the tunnel state database (140) may be implemented in-memory (i.e., the contents of the tunnel state database (140) may be maintained in volatile memory). Alternatively, the tunnel state database (140) may be implemented using persistent storage. In another embodiment of the disclosure, the tunnel state database (140) may be implemented as an in-memory database with a copy of the tunnel state database (140) being stored in persistent storage. In such cases, as changes are made to the in-memory database, copies of the changes (with a timestamp) may be stored in persistent storage. The use of an in-memory database may provide faster access to the contents of the tunnel state database (140).

FIG. 2A shows a flowchart for a method for managing virtual tunnels between two end-point network devices in accordance with one or more embodiments. The method of FIG. 2A may be performed by, for example, an end-point network device (e.g., 130, FIG. 1C). Other components illustrated in FIGS. 1A-1C may perform the method of FIG. 2A without departing from the disclosure. Further, one or more steps in FIG. 2A may be performed concurrently with one or more steps in FIGS. 2A-2B.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a path liveness detection request is obtained for an end-point network device. In one or more embodiments of the disclosure, the path liveness detection request is obtained from via a command line interface (CLI) command obtained from a computing device that is used by an administrator to manage the network traffic between the end-point network device and a second end-point network device operatively connected to a second host computing device.

In step 202, in response to the liveness detection request, one or more paths between the end-point network device and a second end-point network device are identified. In one or more embodiments of the disclosure, the paths are identified using a network state database that may specify the network devices in a network that connect the end-point device to the second end-point network device. Alternatively, the paths may be identified by sending messages to the second-endpoint network devices via the network, and tracking the network devices used to send the message. Other methods may be used to identify the paths without departing from the disclosure.

In step 204, virtual tunnels are set up based on the identified paths using the network devices corresponding to each identified path. In one or more embodiments, the virtual tunnels are set up by selecting, from the identified paths of step 202, a best path based on determined latency during the network traffic. The best path may be selected as the primary virtual tunnel. One or more of the alternative paths may be determined to be backup virtual paths The setup of the virtual tunnel may include setting up a virtual extensible local area network (VXLAN) tunnel between the end-point network devices. Alternatively, the setup may include setting up a network virtualization using generic routing encapsulation (NVGRE) tunnel between the end-point network devices. In another embodiment, the setup may include setting up a multiprotocol label switching (MPLS) tunnel. Other types of tunnels (aside from VXLAN and NVGRE) protocols may be utilized to implement the virtual tunnels without departing from the disclosure.

In step 206, a virtual tunnel state agent is installed to perform the liveness detection on the virtual tunnels. In one embodiment, the virtual tunnel agent is instructed to perform liveness detection of the virtual tunnels. Further, a tunnel state database may be initialized and populated with information about the virtual tunnels and whether they are the primary virtual tunnel or a backup virtual tunnel. Further, the tunnel state database may specify the order of backup virtual tunnels to be used should the current primary virtual tunnel is deemed to be down. The order may be determined based on, for example, the latency during communication using each of the implemented virtual tunnels. In one embodiment, the liveness detection is performed on each of the virtual tunnels using, e.g., BFD, in order to determine whether all network devices in each of the virtual tunnels between two end-point network devices are functional (i.e., whether the network devices are capable of passing network traffic). Thus, the liveness detection may be used to determine whether any portion of the path has failed. This determination may involve determining: (i) whether any network device on a path between two end-point devices has failed (i.e., whether there is a failure on the path that is external to the end-point devices) and/or (ii) whether any of the end-point devices have failed. Those skilled in the art will appreciate that liveness detection may be performed using protocols (or mechanisms other than BFD without departing from the disclosure.

FIG. 2B shows a flowchart for a method for performing a fast failover of a virtual tunnel in accordance with one or more embodiments. The method of FIG. 2B may be performed by, for example, an end-point network device (e.g., 130, FIG. 1C). Other components illustrated in FIGS. 1A-1C may perform the method of FIG. 2B without departing from the disclosure. Further, one or more steps in FIG. 2B may be performed concurrently with one or more steps in FIGS. 2A-2B.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 220, a primary virtual tunnel is monitored between the end-point network devices by sending periodic messages. In one or more embodiments, the primary tunnel is monitored by accessing the tunnel state database to determine a state of the primary virtual tunnel. If the state stored in the tunnel state database indicates an operational state, a tunnel interface of the end-point network device may send a message to the second end-point network device via the primary virtual tunnel and expect a response based on the message. If a response is obtained as expected, the tunnel interface may deem the primary virtual tunnel as operational. If a response is not obtained, the tunnel interface may indicate such lack of response to the virtual tunnel state agent. The virtual tunnel state agent, based on the indication, may update the tunnel state database to indicate a down virtual tunnel. The messages may be sent in a periodic manner.

In step 222, a determination is made about whether the monitoring indicates that the primary virtual tunnel is down (i.e., not operational). In one embodiment, the determination is made based on a change in the BFD state. Specifically, if the BFD state transitions from an "UP" state to a "DOWN" state, then the primary virtual tunnel is determined to be down. If the monitoring indicates that the primary virtual tunnel is down, the method proceeds to step 224; otherwise, the method returns to step 220.

In step 224, a set of backup virtual tunnels between the end-point devices are identified. In one or more embodiments, the set of backup virtual tunnels are identified using the tunnel state database that specifies the backup virtual tunnels corresponding to the connection between the two end-point network devices.

In step 226, a new primary virtual tunnel is selected from the set of backup virtual tunnels in the tunnel state database to be used as the best path. In one or more embodiments, the new primary virtual tunnel is selected using the tunnel state database from the set of backup virtual tunnels that have a BFD state of "UP". The tunnel state database may specify the next available virtual tunnel in the set of backup virtual tunnels.

In step 228, the tunnel state database is updated based on the selected new primary virtual tunnel. In one or more embodiments, the tunnel state database is updated to specify a BFD state of each of the virtual tunnels as down (e.g., for the previous primary virtual tunnel), or as operational for the new primary virtual tunnel.

In response to updating the tunnel state database, the network device hardware is updated to direct packets that were previously being transmitted on via the old primary virtual tunnel path to use the new primary virtual tunnel. More specifically, portions of network device hardware (e.g., one or more forwarding table entries) that need to be updated to redirect the packets that were using the old primary virtual tunnel to use the new primary virtual tunnel are identified. Once these forwarding table entries are identified, they are updated or replaced such that the packets are directed to the tunnel interface associated with the new primary tunnel.

Example 1

This section describes an example in accordance with one or more embodiments. The example is not intended to limit the scope of this disclosure. Turning to the example, FIGS. 3A-3D shows an example in accordance with one or more embodiments. The example shows a system that includes a set of network devices (e.g., network devices 1-11) all connected in a network. Of these network devices, network device 1 (401) and network device 8 (408) are end-point network devices. The network further includes four host computing devices (A-D). The bracketed numbers, e.g., "[1]" correspond to the circled numbers in FIG. 3C.

Figure 3A:
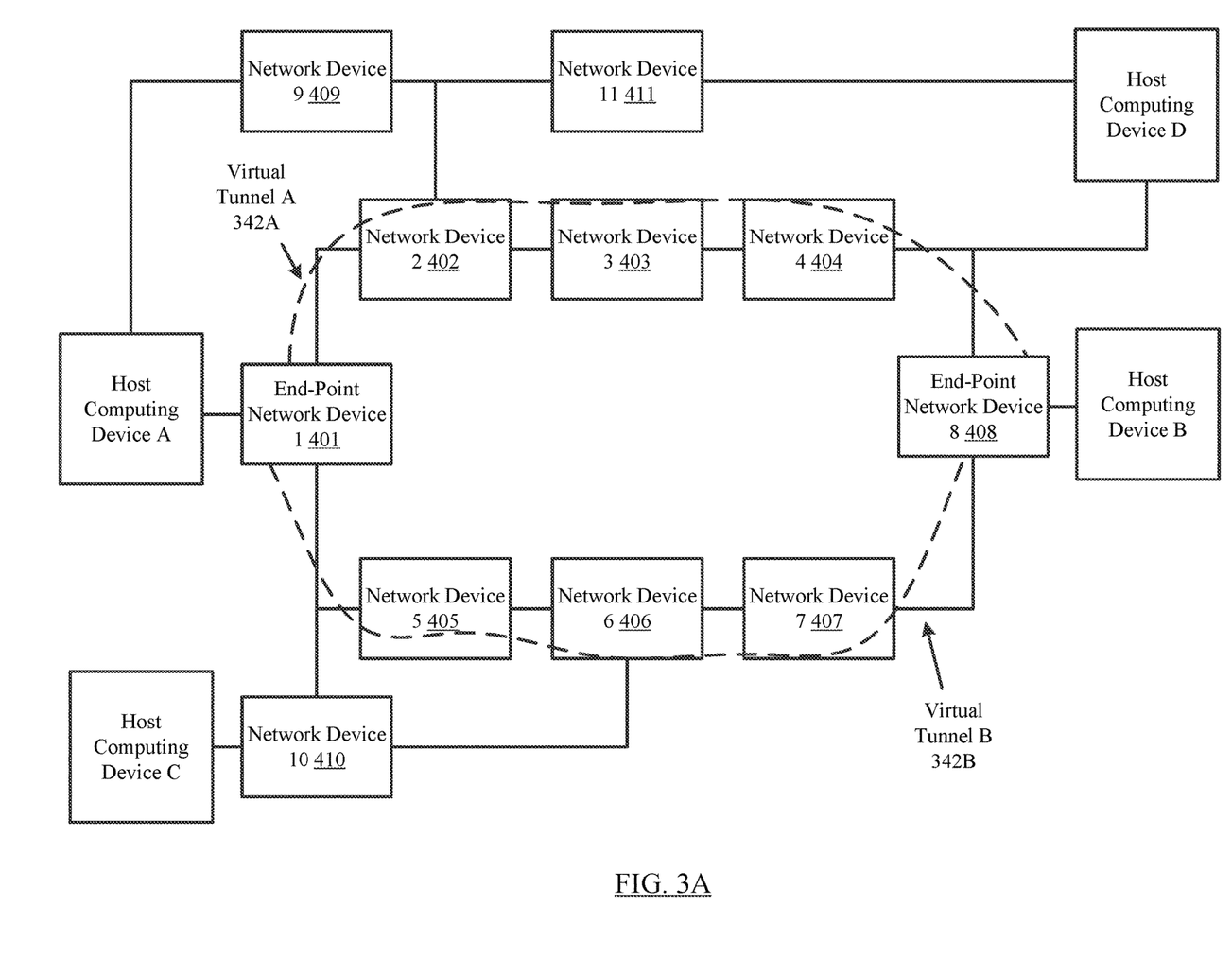
FIGS. 3A-3D show an example in accordance with one or more embodiments described herein.

In FIG. 3A, host computing device A (450A) is directly connected to end-point network device 1 (401), and host computing device B (450B) is directly connected to end-point network device 8 (408). Host computing devices A and B (450A, 450B) are connected via two paths. Path 1 includes the connections of end-point network device 1 (401) (via a first tunnel interface) to network device 2 (402) to network device 3 (403) to network device 4 (404) to end-point network device 8 (408). Path 2 includes the connections of end-point network device 1 (401) (via a second tunnel interface) to network device 5 (405) to network device 6 (406) to network device 7 (407) to end-point network device 8 (408).

Both end-point network device 1 (401) and end-point network device 8 (408) are each prepared with a virtual tunnel state agent that includes setting up virtual tunnels, one for each path, and implementing BFD to monitor each virtual tunnel. Specifically, virtual tunnel A (342A) corresponds to path 1, and virtual tunnel B (342B) corresponds to path 2.

Figure 3B:
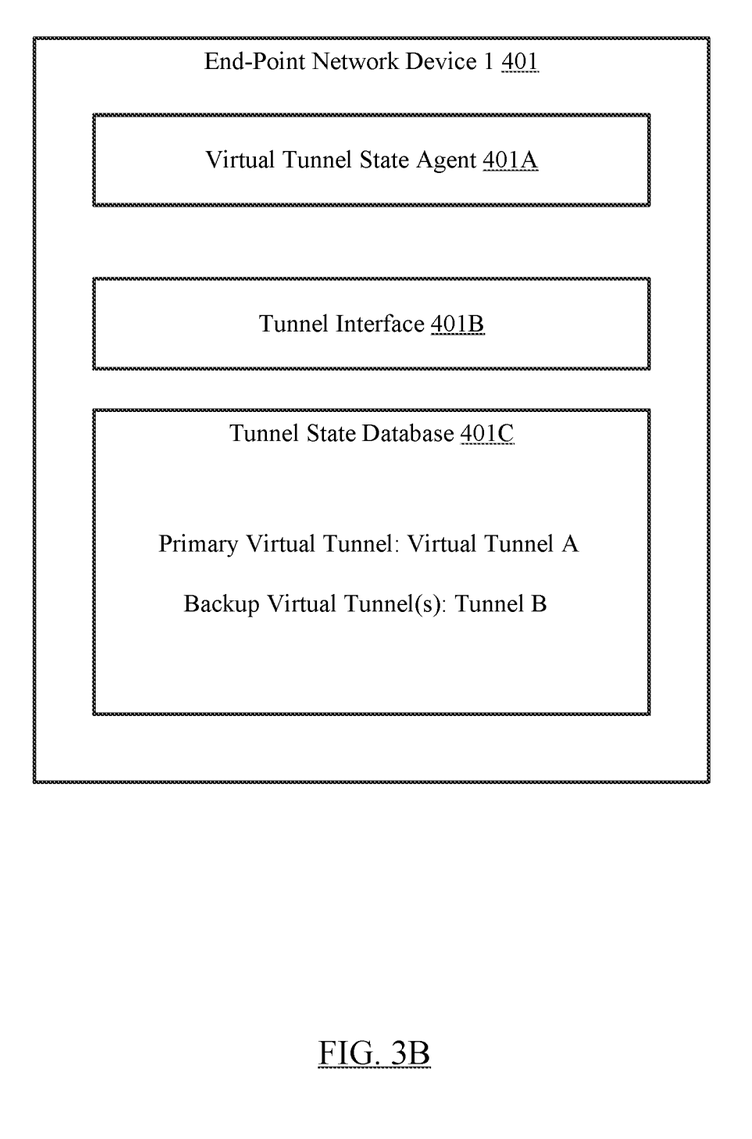

In FIG. 3B, end-point network device 1 (401) includes a virtual tunnel state agent (401A), a tunnel interface (401B), and a tunnel state database (401C). The virtual tunnel state agent (401A) includes functionality for monitoring the virtual tunnels using BFD. The tunnel interface (401B) includes functionality for performing remediation in the event of a down virtual tunnel. The monitoring includes periodically sending messages between end-point network device 1 (401) and network device 8 (408) specifically through the network devices corresponding to the virtual tunnel being monitored. The tunnel interface (401B) includes functionality for updating the tunnel state database (401C) to specify the primary virtual tunnel from end-point network device 1 (401) to end-point network device 8 (408) as virtual tunnel A. Further, the tunnel state database (401C) specifies that virtual tunnel B is a backup virtual tunnel and is to be used in the event that virtual tunnel A is detected to go down.

Figure 3C:
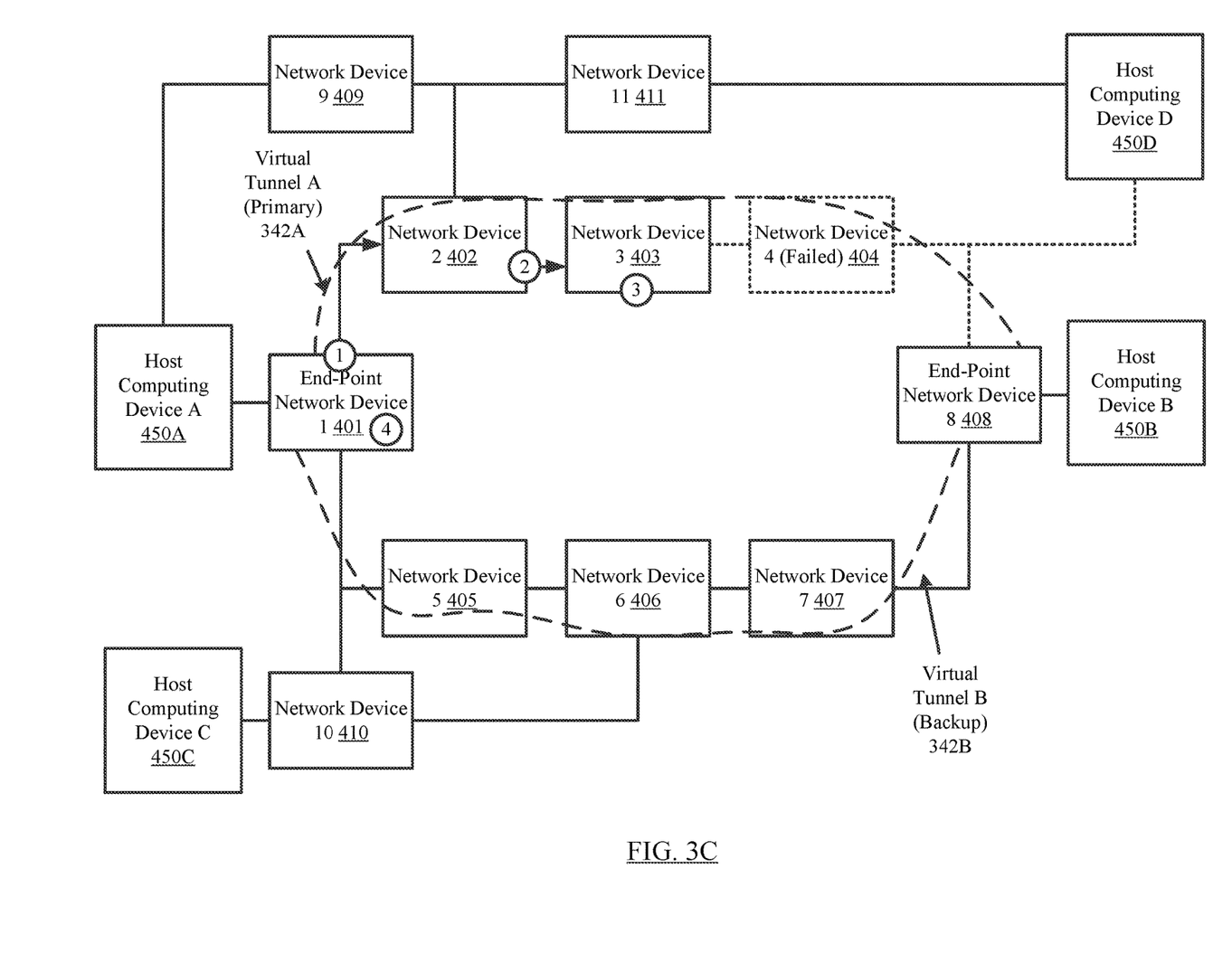

At a later point in time, in FIG. 3C, network device 4 (404) fails. No network traffic may pass through network device 4 (404). End-point network device 1 (401) executes the periodic monitoring of virtual tunnel A (342A) (which, at this point, is the primary virtual tunnel between end-point network device 1 (401) and end-point network device 8 (408)). Specifically, the end-point network device determines that the next hop through virtual tunnel A (342A) is through network device 2 (402) and sends a monitoring packet to network device 2 (342A) [1]. Network device 2 (402) identifies the next hop through virtual tunnel A (342A) is to network device 3 (403) and forwards the monitoring packet to network device 3 (403) [2]. Network device 3 (403) identifies the next hop through virtual tunnel A (342A) is to network device 4 (404) and attempts to forward the monitoring packet to network device 4 (404), but instead detects the lack of communication with network device 4 (404) [3]. After a predetermined period of time of not receiving an expected response from end-point network device 8 (408) via the primary virtual tunnel (342A), end-point network device 1 (401) determines that virtual tunnel A (342A) is down. Based on this determination, end-point network device 1 (401) updates its tunnel state database (not shown in FIG. 3C) to remove virtual tunnel A (342A) from the list of primary virtual tunnels, and to replace it with virtual tunnel B (342B) (previously a backup virtual tunnel) as the new primary virtual tunnel [4].

Figure 3D:
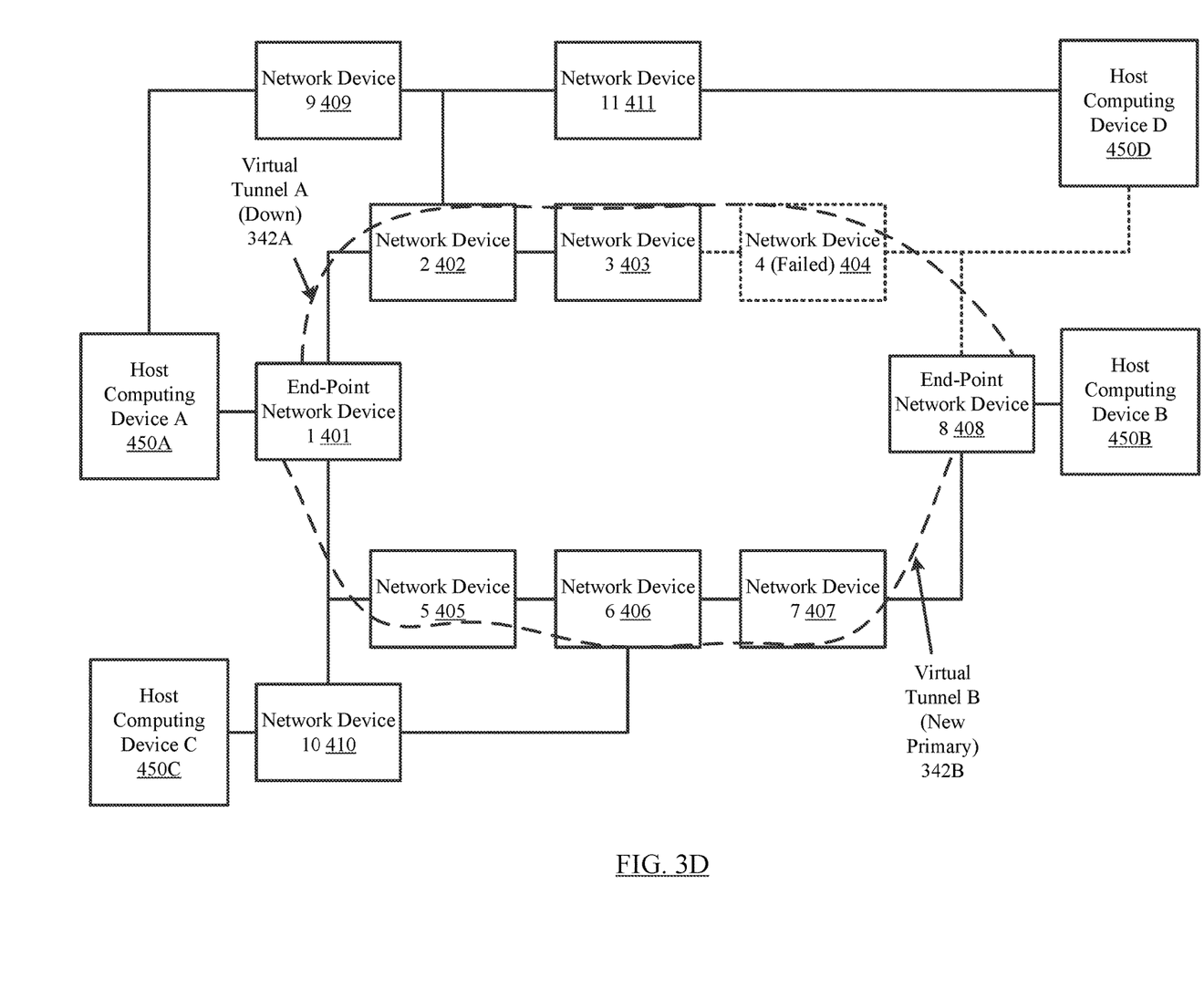

As shown in FIG. 3D, virtual tunnel A (342A) is replaced with virtual tunnel B (342B). In this manner, any network traffic between host computing devices A and B (450A, 450B) passing through end-point network device 1 (401) are to be passed via virtual tunnel B (342B) as the new primary virtual tunnel.

End of Example

Example 2

While embodiments described above are directed to monitoring connectivity of network devices in an overlay network, embodiments disclosed here may also be applied to detecting connectivity in an underlay network and then taking corrective action based on the detecting. For example, consider a scenario in which a first router (R1) is connected to a second Router (R2) via two distinct paths (P1 and P2). P1 includes the following network devices R1↔switch (S1)↔switch (S2)↔R2. Further, P2 includes R1↔switch (S1)↔switch (S3)↔R2. In this example, R1 and R2 are considered neighbors in the underlay network (i.e., IP network). Further, each of the switches (S1, S2, S3) are only able to transmit packets using layer 2 protocols (i.e., they only have functionality to forward packets but not route packets).

To determine whether there is IP connectivity between R1 and R2, a connectivity state agent may be configured on R1 and R2. Similar to the virtual tunnel state agent, the connectivity state agent may use BFD to determine whether there is IP connectivity between R1 and R2 via P1 (which is initially designated as the primary path). If a determination is made that there is no IP connectivity between R1 and R2 via P1 (e.g., S2 has failed), then R1's network device hardware is updated to stop using P1 and start using P2 to communicate with R2. While the above example includes a network topology in which at least one switch (i.e., S1) is used in multiple paths between the routers, embodiments are not limited to such network topologies. For example, the aforementioned embodiment may be implemented in network topologies in which a given switch is not used in more than one path between two routers.

Thus, for the aforementioned embodiment directed to an underlay network, the liveness detection may be used to determine whether any portion of the path has failed. This determination may involve determining: (i) whether any network device on a path between two end-point devices has failed (i.e., whether there is a failure on the path that is external to the end-point devices) and/or (ii) whether any of the end-point devices have failed.

Further, with respect to aforementioned embodiment directed to underlay networks, those skilled in the art will appreciate that liveness detection may be performed using protocols (or mechanisms other than BFD without departing from the disclosure.

End of Example 2

As seen from the above examples, embodiments disclosed herein may be utilized to detect connectivity between network devices that are connected via either an underlay network or an overlay network. Further, a connectivity state agent may perform substantially the same operations as the virtual tunnel state agent as described throughout this application, except that the connectivity state agent monitors IP connectivity in the underlay network and then selects a secondary path in the underlay network if the primary path is determined to have failed.

Figure 4:
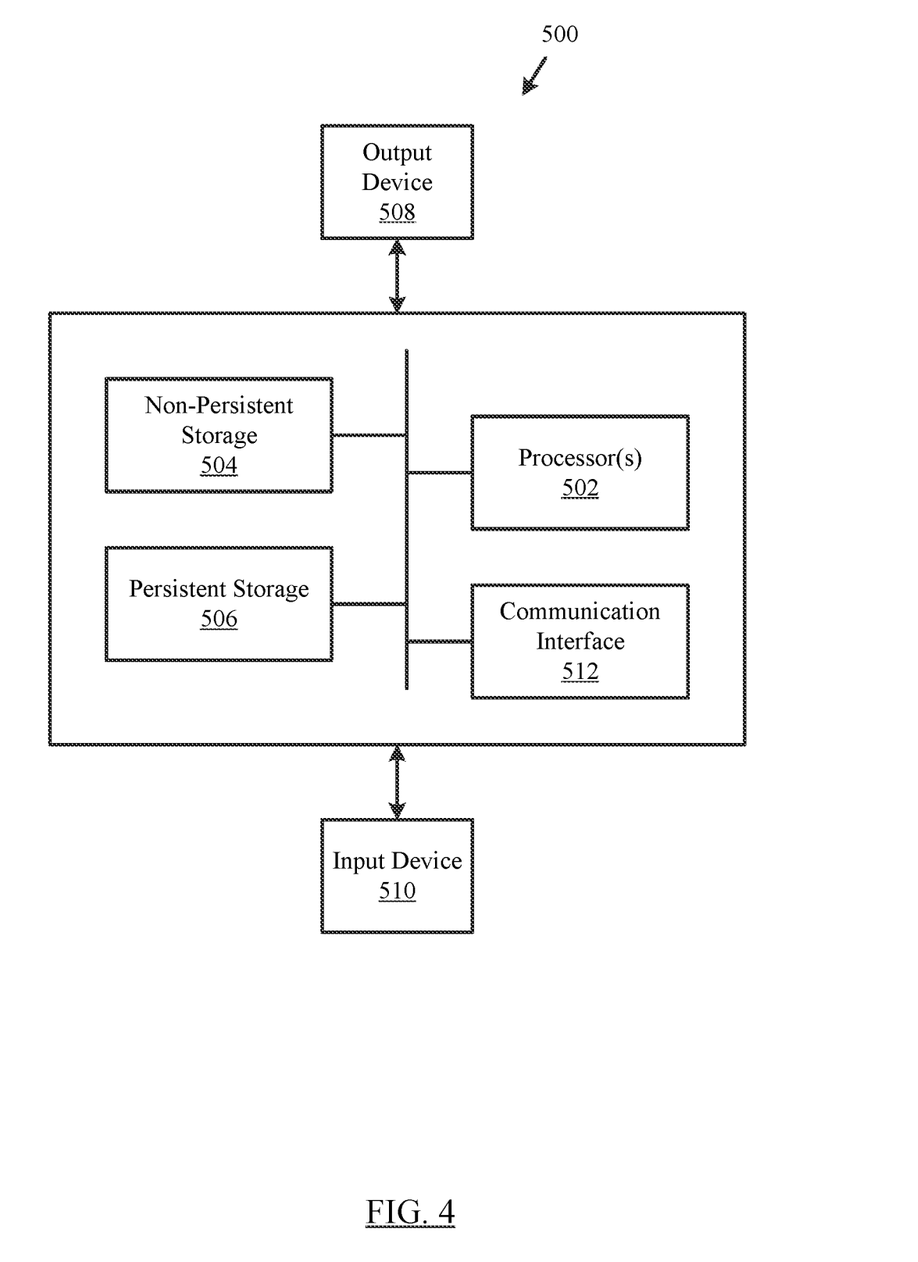
FIG. 4 shows a diagram of a computing device in accordance with one or more embodiments described herein.

As discussed above, embodiments of the disclosure may be implemented using computing devices. FIG. 4 shows a diagram of a computing device in accordance with one or more embodiments of the disclosure. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of the components illustrated in FIG. 4 is described below.

In one embodiment of the disclosure, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments described herein allow for the operation of network devices that may experience states of inoperability during network traffic. Embodiments of the disclosure provide a mechanism for quickly identifying a virtual tunnel that is not operational, and performing a quick failover to reduce the time taken to remediate the inoperability. By providing liveness detection, embodiments of the disclosure improve the operation of the network that transmits data across host computing devices.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing traffic flow along a path between network devices, the method comprising:
  initiating, by an end-point network device, monitoring of the path, wherein the end-point network device transmits packets to a target network device over the path;

detecting after the initiating, by the end-point network device, that at least a portion of the path has failed, wherein the portion of the path that has failed is external to the end-point network device, wherein the end-point network device connects to the path using a local interface, wherein the local interface is located on the end-point network device, wherein the local interface is up when the end-point network device detects that at least the portion of the path has failed;

in response to the detecting, identifying which portions of network device hardware in the end-point network device need to be updated to redirect the packets from the end-point network device to the target network device to take a second path; and updating the identified portions of the network device hardware.

2. The method of claim 1, wherein the path is a virtual tunnel.

3. The method of claim 2, wherein the virtual tunnel is a virtual extensible local area network (VXLAN) tunnel.

4. The method of claim 2, wherein the virtual tunnel is a Network Virtualization Using Generic Routing Encapsulation (NVGRE) tunnel.

5. The method of claim 2, wherein the virtual tunnel is a Multiprotocol Label Switching (MPLS) tunnel.

6. The method of claim 1, wherein the initiating of the monitoring of the path comprises initiating bidirectional forwarding detection (BFD) on the path.

7. The method of claim 6, wherein the detecting that at least the portion of the path has failed comprises detecting a change in BFD state of the path.

8. The method of claim 1, wherein the local interface is a virtual tunnel interface (VTI).

9. An end-point network device, comprising:
a tunnel state database specifying a path and a second path between the end-point network device and a target network device;
a local interface to which the path is connected;
network device hardware configured to transmit packets to the target network device over the path;
a processor; and
a virtual tunnel state agent comprising instructions which, when executed by the processor, causes the processor to:
initiate monitoring of the path;
detect, based on the monitoring of the path, that at least a portion of the path, beyond the local interface, has failed; and
update, based on detecting that at least the portion of the path has failed, the network device hardware to redirect packets from the end-point network device to the target network device using the second path.

10. The end-point network device of claim 9, wherein the path is a virtual tunnel.

11. The end-point network device of claim 10, wherein the virtual tunnel is a virtual extensible local area network (VXLAN) tunnel or a Network Virtualization Using Generic Routing Encapsulation (NVGRE) tunnel.

12. The end-point network device of claim 9, wherein the portion of the path that has failed is at a remote end of the path with respect to the end-point network device.

13. The end-point network device of claim 10, wherein the virtual tunnel is a Multiprotocol Label Switching (MPLS) tunnel.

14. The end-point network device of claim 9, wherein the processor initiates the monitoring of the path by initiating bidirectional forwarding detection (BFD) on the path.

15. The end-point network device of claim 14, wherein the processor detects that at least the portion of the path has failed by detecting a change in BFD state of the path.

16. The end-point network device of claim 9, wherein the local interface is up when the processor detects that at least the portion of the path has failed.

17. A method for managing traffic flow between a first router and a second router coupled to each other via a first path containing a first set of one or more switches and via a second path containing a second set of one or more switches, the method comprising:
initiating, by the first router, bidirectional forwarding detection (BFD) on the first path by periodically sending messages for BFD from the first router to the second router via the first path and expecting reception of a corresponding response from the second router to each message in the sent messages;
detecting after the initiating, by the first router, that the corresponding response to a given message in the sent messages has not been received within a period of time, the corresponding response not being received within the period of time indicating that at least a portion of the first path has failed; and
in response to the detecting, updating one or more portions of network device hardware in the first router to redirect packets from the first router to the second router to take the second path instead of the first path.

18. The method of claim 17, wherein at least one switch in the first set of one or more switches is also a member of the second set of one or more switches.

19. The method of claim 17, wherein the first path lacks any intervening routers between the first and second routers and wherein the second path lacks any intervening routers between the first and second routers.

20. The method of claim 17, wherein the failure portion of the first path is at the first set of one or more switches or at the second router.

* * * * *